Patented Aug. 22, 1944

2,356,316

UNITED STATES PATENT OFFICE 2,356,316

GLASS ENAMEL COMPOSITION

Carl J. Harbert, Shaker Heights, and Robert F. Morrison, Elyria, Ohio, assignors to The Harshaw Chemical Company, Elyria, Ohio, a corporation of Ohio No Drawing. Application June 28, 1943, Serial No. 492,642

10 Claims. (Cl. 106—49)

This invention relates to low fusing enamels of superior alkali resistance suitable for application to glass, and to glass articles having such enamels applied thereon.

Prior to our invention it has been known to incorporate titania and zirconia in an enamel of this type for securing acid and alkali resistance. U. S. Patent No. 2,225,159 teaches that titania will impart acid resistance to these enamels. U. S. Patent No. 2,278,868 teaches that zirconia will impart alkali resistance. U. S. Patent No. 2,312,788 discloses glass enamels containing both titania and zirconia and claims excellent resistance to acid, alkalies and sulfides. We have experimented with these compositions and have found that the use of titania and zirconia do give good resistance to acids and alkalies respectively, but not as good as might be desired, particularly in respect to gloss and initial attack by alkalies. We have noted that when samples of such enamels are boiled in 10% caustic soda, the attack as measured by loss of spectral gloss (determined on the Hunter reflectometer) is initially rapid, the curve flattening out after the first hour.

We have now discovered that by making use of both zirconia and barium oxide we are able to produce glass enamels of much improved alkali resistance as shown by slow loss of spectral gloss and longer life in the boiling caustic solution. We may add zirconia and BaO separately, but even better results, especially in respect to gloss, are attained if BaO and $ZrO_2$ are added in the form of barium zirconate ($BaZrO_3$).

Obviously, it is not necessary to employ in the batch the oxides themselves provided materials capable of yielding them are employed. For example, boric oxide may be supplied by boric acid, soda and silica may be added to the batch as sodium silicate, soda may be added as sodium carbonate, etc.

For comparison of results, comparable samples were made up having analyzed composition in parts by weight as follows:

|  | No. 1 | No. 2 |
|---|---|---|
| $SiO_2$ | 28.75 | 26.9 |
| $Na_2O$ | 4.66 | 4.38 |
| $TiO_2$ | 2.11 | 1.99 |
| PbO | 51.10 | 48.00 |
| $B_2O_3$ | 6.00 | 5.65 |
| ZnO | 1.02 | .96 |
| CdO | 2.54 | 2.39 |
| $ZrO_2$ | 4.07 | |
| $BaZrO_3$ | | 9.83 |

The essential difference in the two samples was the use in one case of $ZrO_2$ and in the other case of $BaZrO_3$. These enamels were applied to glass and tested in 10% caustic soda at 195° F. At 40 hours, sample 1 was entirely consumed over approximately one third of the surface and obviously almost gone over the remaining surface. Sample 2 subjected to the same test was still in good condition and remained another ten hours in the caustic solution before presenting an appearance similar to No. 1 at 40 hours.

Measurements on samples of the same enamels to show loss of spectral gloss during the first six hours of boiling in 10% caustic soda gave the following results:

|  | No. 1 | No. 2 |
|---|---|---|
| Per cent spectral gloss initial | 6.4 | 6.4 |
| Per cent spectral gloss after 1 hr | 1.9 | 6.2 |
| Per cent spectral gloss after 2 hrs | 1.4 | 5.4 |
| Per cent spectral gloss after 3 hrs | 1.3 | 4.7 |
| Per cent spectral gloss after 4 hrs | 1.3 | 4.5 |
| Per cent spectral gloss after 5 hrs | 1.2 | 4.2 |
| Per cent spectral gloss after 6 hrs | 1.1 | 3.7 |

The enamel compositions of the invention are essentially low fusing (not above 640° C.) lead borosilicate glazes containing when desired special additions for special functions and all containing barium oxide and zirconium oxide for alkali resistance or preferably barium zirconate instead.

Suitable composition ranges, on the analytical basis, are as follows: Lead oxide 40 to 60 per cent, silica 22 to 32 per cent, boric oxide 3 to 12 per cent, titania 0 to 5 per cent, preferably 2 to 4 per cent, soda 3 to 7, preferably about 5 per cent, cadmium oxide 0 to 5 per cent, and barium oxide plus zirconium oxide 5 to 15 per cent, preferably in the ratio BaO to $ZrO_2$ equals from 0.7:1.0 to 1.0:0.5, most suitably in the ratio corresponding to $BaZrO_3$. Percentages and proportions are by weight exclusive of the weight of pigment.

On the basis of percentages, we may employ $ZrO_2$ 41% to 67% and BaO 59% to 33%, by weight based on combined weights of BaO and $ZrO_2$. Smaller amounts of barium and zirconium oxides or of barium zirconate are of substantial but lesser value.

By referring to composition ranges on the anayltical basis, we intend to indicate that the constituent oxides will be found on analysis in those proportions, but we do not intend to indicate the kind of physical or chemical association which may exist in the glaze itself.

The following examples will serve to illustrate the invention:

| Material | Smelter batch A, parts by weight | Smelter batch B, parts by weight |
|---|---|---|
| Sodium silicate | 11.91 | 11.91 |
| Sodium titanium silicate | 7.20 | 7.29 |
| Lead monosilicate | 55.30 | 55.30 |
| Cadmium oxide | 3.00 | 3.00 |
| Boric acid | 10.60 | 10.60 |
| Silica | 7.47 | 7.47 |
| Barium zirconate | 9.00 | |
| Zirconium dioxide | | 4.00 |
| Barium oxide | | 5.00 |
| Total | 104.48 | 104.48 |

| Material | Frit from batch A | Frit from batch B |
|---|---|---|
| $Na_2O$ | 5.05 | 5.05 |
| $SiO_2$ | 27.10 | 27.10 |
| $TiO_2$ | 2.75 | 2.75 |
| PbO | 47.00 | 47.00 |
| CdO | 3.00 | 3.00 |
| $B_2O_3$ | 6.00 | 6.00 |
| $BaZrO_3$ | 9.00 | |
| $ZrO_2$ | | 4.00 |
| BaO | | 5.00 |
| Total | 99.90 | 99.90 |

These examples are merely representative of many compositions possible according to the invention. Lead borosilicate is the fundamental basis of the enamel which may contain various proportions of the oxides of lead, sodium, boron and silicon according to desired maturing temperature, coefficient of expansion, etc., all of which is understood by persons skilled in the art. Titania functions to improve acid resistance and the amount is not critical. If acid resistance is not essential, titania can be omitted. Cadmium oxide is present in this example to condition the frit for use of a cadmium color to be introduced as a mill addition.

The barium zirconate is added for alkali resistance or, in Batch B, barium oxide and zirconia are used instead of barium zirconate. The use of BaO and $ZrO_2$ as separate ingredients gives greatly improved results as over a similar batch omitting BaO but the use of barium zirconate is even better in that the final enamel has a superior gloss. The invention comprehends the use of both BaO and $ZrO_2$ as the smelter addition for alkali resistance or, alternatively, the use of barium zirconate as the smelter addition for attaining alkali resistance and superior gloss. We may also use BaO, $ZrO_2$ and $BaZrO_3$ if desired, in which case the enamel should still show on analysis the indicated proportions of BaO and $ZrO_2$.

The ingredients of the batch are smelted sufficiently to produce a clear melt which is then fritted in the usual manner and is ready to be ground with suitable mill additions in the preparations of the enamel. The most important mill additions are, of course, pigments either white or colored. Normally we make up the batch such as indicated in the examples, melt it to a clear melt, frit it into water and then grind the frit with the pigment and other usual mill additions. It is possible, of course, to add some pigments in the batch, that is, as smelter additions, but we prefer to add them at the mill. The pigment selected should be such that when the enamel is applied to glass and fused on the pigment particles do not melt. Thus the enamel consists of pigment particles dispersed in a melted glaze matrix of the compositions indicated above.

Having thus described our invention, what we claim is:

1. A lead borosilicate glaze suitable for decorating glassware, having a fusing temperature not higher than 640° C. and exhibiting superior alkali resistance, said glaze comprising a pigment dispersed in a glaze matrix of lead borosilicate type and said matrix containing as smelted in addition for imparting high alkali resistance barium oxide and zirconium dioxide in the proportion of $ZrO_2$ 41% to 67% and BaO 59% to 33% based on the combined weights of BaO and $ZrO_2$, barium oxide and zirconium dioxide aggregating from 5% to 15% of the matrix by weight.

2. A glass article having at least a portion of its surface coated with the glaze defined in claim 1.

3. A glaze according to claim 1 wherein the oxides of barium and zirconium are present as barium zirconate.

4. A lead borosilicate glaze of low melting point suitable for decorating glassware and exhibiting high resistance to alkalies, especially in respect to retention of gloss when subjected to alkalies, said glaze comprising a pigment dispersed in a melted matrix, said matrix containing, on the analytical basis, the oxides of lead, silicon, sodium and boron and also the oxides of zirconium and barium, the two last named oxides constituting from 5 to 15 per cent of the glaze by weight and the ratio of BaO to $ZrO_2$ varying from 0.7:1.0 to 1.0:0.5.

5. A lead borosilicate glaze of low melting point suitable for decorating glassware and exhibiting high resistance to alkalies, especially in respect to retention of gloss when subjected to alkalies, said glaze comprising a pigment dispersed in a melted matrix, said matrix containing, on the analytical basis, the oxides of lead, silicon, sodium and boron and also the oxides of zirconium and barium, the two last named oxides constituting from 5 to 15 per cent of the glaze by weight and being present in approximately the proportions corresponding to $BaZrO_3$.

6. A lead borosilicate glaze of low melting point suitable for application to glass and comprising a pigment and a melted glaze matrix, said matrix being on the analytical basis composed of the following oxides in approximately the proportions indicated:

| | Parts by weight |
|---|---|
| PbO | 40 to 60 |
| $Na_2O$ | 3 to 7 |
| $SiO_2$ | 22 to 32 |
| $B_2O_3$ | 3 to 12 |
| $TiO_2$ | 0 to 5 |
| $ZrO_2$ 41% to 67% <br> BaO 59% to 33% | 5 to 15 |

7. A glass article having at least a portion of its surface coated with the glaze defined in claim 6.

8. A lead borosilicate glaze of low melting point suitable for application to glass and comprising a pigment and a melted glaze matrix, said matrix being on the analytical basis composed of the following oxides in approximately the proportions indicated:

| | Parts by weight |
|---|---|
| PbO | 40 to 60 |
| $Na_2O$ | 3 to 7 |
| $SiO_2$ | 22 to 32 |

| | Parts by weight |
|---|---|
| $B_2O_3$ | 3 to 12 |
| $TiO_2$ | 2 to 4 |
| $ZrO_2$ 41% to 67%<br>$BaO$ 59% to 33% | 5 to 15 |

9. A glass article having at least a portion of its surface coated with the glaze defined in claim 8.

10. A method of making a glaze composition which includes the step of smelting together to produce a clear melt, a batch containing barium zirconate and materials capable of yielding:

| | Parts by weight |
|---|---|
| PbO | 40 to 60 |
| $Na_2O$ | 3 to 7 |
| $SiO_2$ | 22 to 32 |
| $B_2O_3$ | 3 to 12 | barium zirconate amounting to from 5 to 15 per cent by weight of the resulting melt.

CARL J. HARBERT.
ROBERT F. MORRISON.